(12) United States Patent
Hassani et al.

(10) Patent No.: US 10,297,251 B2
(45) Date of Patent: May 21, 2019

(54) VEHICLE HAVING DYNAMIC ACOUSTIC MODEL SWITCHING TO IMPROVE NOISY SPEECH RECOGNITION

(71) Applicant: Ford Global Technologies, LLC, Dearborn, MI (US)

(72) Inventors: Ali Hassani, Ann Arbor, MI (US); Scott Andrew Amman, Milford, MI (US); Francois Charette, Tracy, CA (US); Brigitte Frances Mora Richardson, West Bloomfield, MI (US); Gintaras Vincent Puskorius, Novi, MI (US); An Ji, Novi, MI (US); Ranjani Rangarajan, Dearborn, MI (US); John Edward Huber, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 15/002,563

(22) Filed: Jan. 21, 2016

(65) Prior Publication Data

US 2017/0213549 A1 Jul. 27, 2017

(51) Int. Cl.

| G10L 21/02 | (2013.01) |
| G10L 15/20 | (2006.01) |
| G10L 15/065 | (2013.01) |
| G10L 15/08 | (2006.01) |
| G10L 15/22 | (2006.01) |
| G10L 25/84 | (2013.01) |

(52) U.S. Cl.
CPC ............ *G10L 15/20* (2013.01); *G10L 15/065* (2013.01); *G10L 15/08* (2013.01); *G10L 15/22* (2013.01); *G10L 25/84* (2013.01); *G10L 2015/081* (2013.01); *G10L 2015/223* (2013.01)

(58) Field of Classification Search
CPC ....... G10L 15/20; G10L 15/00; G10L 15/065; G10L 15/063; G10L 2105/0631; G10L 2105/0633; G10L 2105/0635; G10L 2105/0636; G10L 2105/0638; G10L 15/08; G10L 15/22; G10L 25/84; G10L 25/81; G10L 25/78; G10L 15/005; G10L 15/02; G10L 15/04; G10L 15/05
USPC ......... 704/233–234, 226–228, 275, 200, 260
See application file for complete search history.

(56) References Cited

U.S. PATENT DOCUMENTS 5,864,809 A 1/1999 Suzuki
7,590,530 B2 9/2009 Zhao et al.
(Continued)

FOREIGN PATENT DOCUMENTS

KR 20100101986 A * 9/2010

OTHER PUBLICATIONS

Intellectual Property Office, Search Report for the corresponding Great Britain Patent Application No. GB1701046.3, dated Jul. 21, 2017.

*Primary Examiner* — Dwayne D Bost
*Assistant Examiner* — Stephen M Brinich
(74) *Attorney, Agent, or Firm* — Frank A. MacKenzie; Brooks Kushman P.C.

(57) ABSTRACT

An automatic speech recognition system for a vehicle includes a controller configured to select an acoustic model from a library of acoustic models based on ambient noise in a cabin of the vehicle and operating parameters of the vehicle. The controller is further configured to apply the selected acoustic model to noisy speech to improve recognition of the speech.

8 Claims, 3 Drawing Sheets

(56) References Cited

U.S. PATENT DOCUMENTS

| | | |
|---|---|---|
| 7,676,363 B2 | 3/2010 | Chengalvarayan et al. |
| 7,729,911 B2 | 6/2010 | Chengalvarayan et al. |
| 8,700,394 B2 | 4/2014 | Seltzer et al. |
| RE45,289 E * | 12/2014 | Goldberg ................ G10L 15/20 704/233 |
| 2005/0071159 A1* | 3/2005 | Boman ............... G10L 21/0208 704/233 |
| 2007/0073539 A1 | 3/2007 | Chengalvarayan et al. |
| 2007/0256027 A1* | 11/2007 | Daude .................... B60K 35/00 715/810 |
| 2012/0072224 A1* | 3/2012 | Khitrov .................. G10L 13/08 704/260 |
| 2013/0185065 A1* | 7/2013 | Tzirkel-Hancock .... G10L 15/20 704/233 |
| 2015/0127351 A1* | 5/2015 | Buck ...................... G10L 21/02 704/270 |
| 2016/0379630 A1* | 12/2016 | Assayag ................ G10L 15/22 704/235 |

* cited by examiner

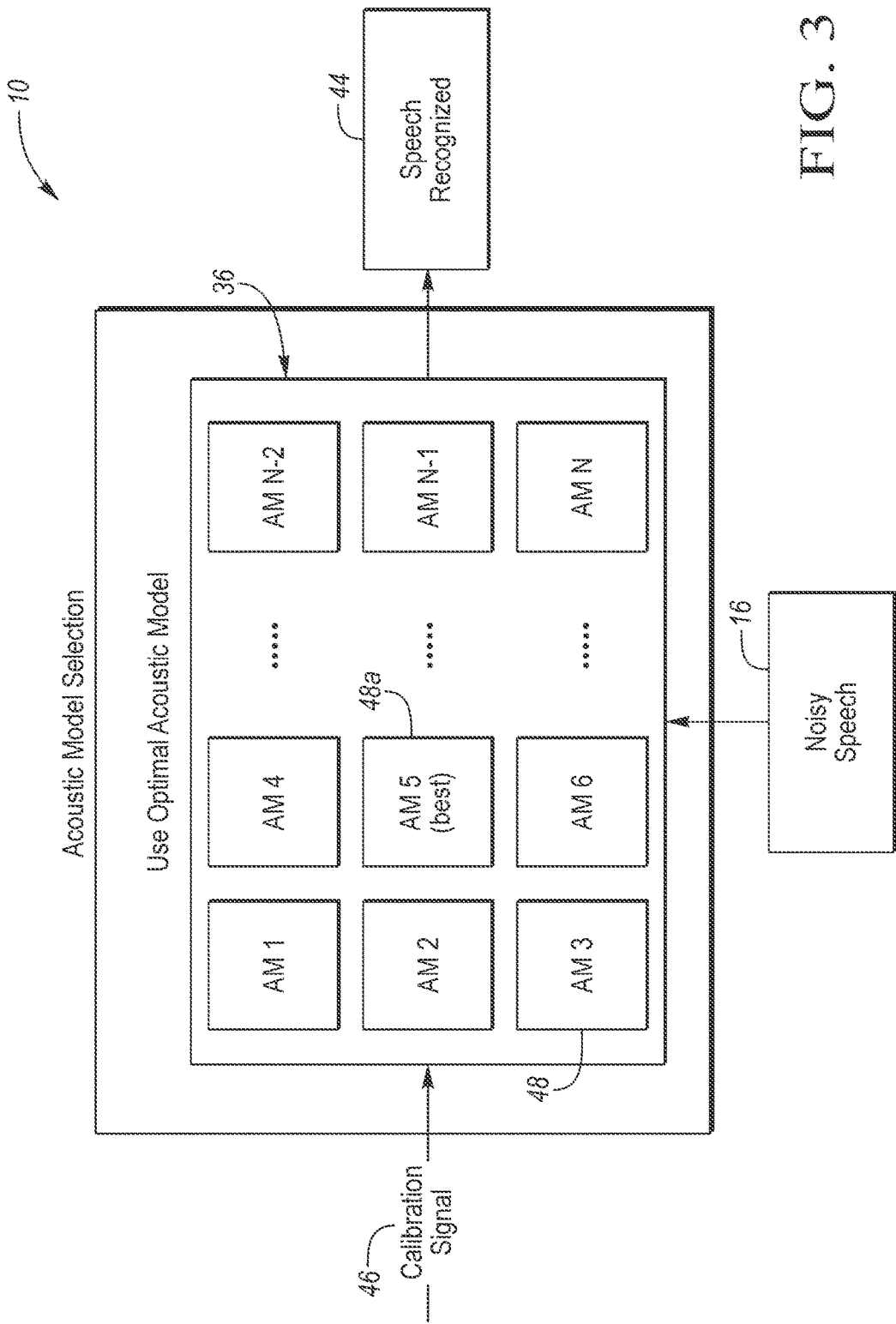

VEHICLE HAVING DYNAMIC ACOUSTIC MODEL SWITCHING TO IMPROVE NOISY SPEECH RECOGNITION

TECHNICAL FIELD

The present disclosure relates to dynamic switching of acoustic models to improve speech recognition performance.

BACKGROUND

The in-vehicle user experience may be enhanced by improving how users interact with their vehicles via speech. In this regard, it is desired to improve the ability of an Automatic Speech Recognition (ASR) system of a vehicle to consistently recognize voice commands while the vehicle is operating under varied operating conditions.

Traditional acoustic models are static and trained under a variety of operating conditions considered typical for ASR use cases. For a vehicle, typical operating conditions include vehicle idling in a parking lot, vehicle driving on the highway with the windows up, vehicle driving on the highway with the windows down, etc. The structure of the vehicle such as the amount of insulation in the vehicle cabin, fuel economy structural characteristics of the vehicle, etc., is also taken into account. The typical operating conditions have significantly different background noise levels which inherently present a challenge in building a static acoustic model. Consequently, a single, static acoustic model is incapable of working well under varied operating conditions.

The Lombard Effect is a human response to ambient noise, where the speaker speaks louder as a compensatory mechanism. In addition to the Lombard Effect being an increase in the output volume of a speech, the spectral density of the speech shifts towards higher frequencies and the duration of phonemes increases. These changes in spectra more so than the decrease in signal-to-noise ratio presents challenges to speech recognition engines. Therefore, a problem presented is that a robust acoustic model is to perform equally well for both neutral (non-Lombard) speech and noisy (Lombard) speech, despite the change in spectra.

SUMMARY

An automatic speech recognition system for a vehicle includes a controller. The controller is configured to select an acoustic model from a library of acoustic models based on ambient noise in a cabin of the vehicle and operating parameters of the vehicle. The controller is further configured to apply the selected acoustic model to noisy speech to improve recognition of the speech.

The system may further include cabin noise microphones configured to detect ambient noise in the cabin of the vehicle. The controller may be in communication with the cabin noise microphones to receive information indicative of the ambient noise in the cabin of the vehicle.

The controller may be in communication with a controller area network (CAN) bus of the vehicle to obtain information indicative of the operating parameters of the vehicle. The information indicative of the operating parameters of the vehicle may include information indicative of vehicle engine rpm, vehicle speed, and vehicle HVAC settings.

The controller may be further configured to select the acoustic model by initially selecting a sub-set of the acoustic models from the library based on the ambient noise in the cabin of the vehicle and subsequently selecting the acoustic model from the sub-set of the acoustic models based on the operating parameters of the vehicle.

The controller may be in communication with a wearable worn by a user of the vehicle to obtain contextual information from the wearable. The controller may be further configured to select the acoustic model from the library of acoustic models based on ambient noise in the cabin of the vehicle, operating parameters of the vehicle, and the contextual information.

The controller may be in communication with a user microphone in the cabin of the vehicle to receive the noisy speech.

The acoustic models may be Lombard Effect acoustic models.

The controller may be further configured to estimate a Lombard Effect of the noisy speech based on the ambient noise in the cabin of the vehicle and the operating parameters of the vehicle and select the acoustic model from the library of acoustic models based on the estimated Lombard Effect.

The controller may be further configured to estimate a Lombard Effect component of the noisy speech based on dB level and spectral analysis of the ambient noise in the cabin of the vehicle, estimate a Lombard Effect component of the noisy speech based on the operating parameters of the vehicle, and select the acoustic model from the library of acoustic models based on the estimated Lombard Effect components.

An automatic speech recognition method for a vehicle includes selecting an acoustic model from a library of acoustic models based on ambient noise in a cabin of the vehicle and operating parameters of the vehicle. The method further includes applying the selected acoustic model to noisy speech to improve recognition of the speech.

BRIEF DESCRIPTION OF THE DRAWINGS

FIG. 3 illustrates a block diagram depicting acoustic model selection and selected acoustic model usage for speech recognition operations of the ASR system.

DETAILED DESCRIPTION

Figure 1:
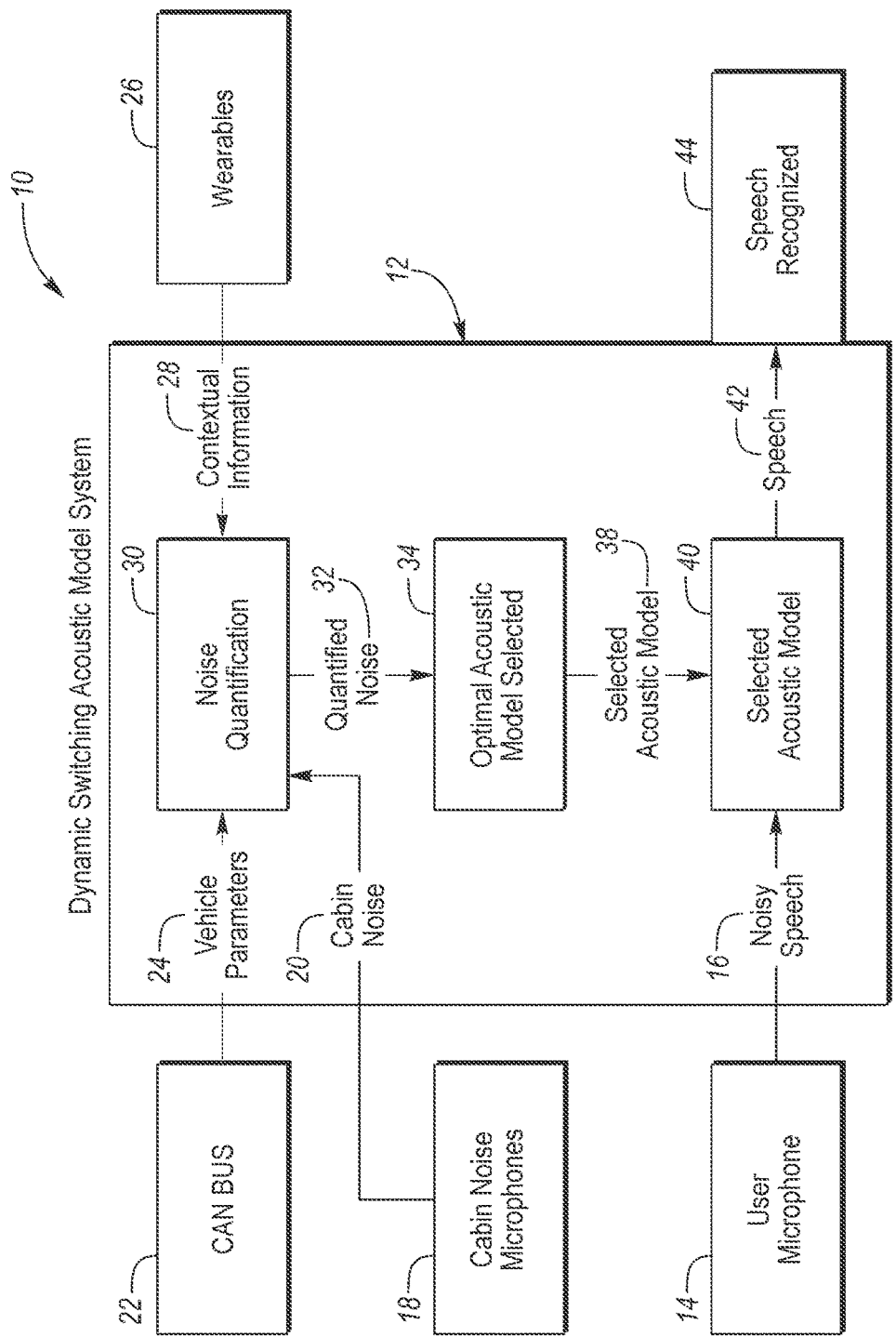
FIG. 1 illustrates a block diagram of an Automatic Speech Recognition (ASR) system for use in a vehicle.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure provides Automatic Speech Recognition (ASR) systems and methods which employ dynamic switching of Lombard Effect acoustic models ("acoustic models") to improve speech recognition performance. The ASR systems and methods make use of data collected on the Lombard Effect being leveraged to relate noise type with changes in spectral content to properly accommodate for both clean and noisy speech.

As indicated above in the Background section, a problem is for a robust acoustic model to perform equally well for both neutral (non-Lombard) speech and noisy (Lombard) speech, despite the change in speech spectra. To solve this problem, the ASR systems and methods provided by the present disclosure for a vehicle employ an architecture that estimates the impact of the Lombard Effect by taking into account various inputs from the cabin noise in the vehicle. In this manner, the ASR systems and methods can actually dynamically switch to the acoustic model, selected from a library of pre-established acoustic models, best trained for that situation to best accommodate the various types of noisy speech in addition to neutral speech.

As embedded platforms now include graphics processing units (GPUs) with large amounts of random access memory (RAM) for massive parallelization capabilities, it is possible to put multiple acoustic models into a single vehicle system. The ASR systems and methods of the present disclosure dynamically select an appropriate acoustic model, from a library of pre-trained acoustic models put into the vehicle system, as a function of vehicle parameters and ambient noise.

The ASR systems and methods provided by the present disclosure involve a handful of acoustic models being trained in a laboratory setting where the resources are available to capture the important use cases. A function is then made to correlate a given noise to the best represented acoustic model. The noise is quantified by several different means including, but not limited to: information indicative of vehicle parameters such as information from the controller area network (CAN) bus of the vehicle on vehicle speed, engine rpm, and HVAC settings; information indicative of vehicle cabin noise such as information from cabin noise microphones doing passive noise analysis; and/or contextual information provided by wearables.

As an example, the ASR systems and methods of the present disclosure in a vehicle use cabin noise dB level/spectral analysis to prescreen the selection of acoustic models from a library of pre-trained acoustic models. The ASR systems and methods then use vehicle parameters such as engine rpm and HVAC setting to further pare down the selection since the acoustic model for engine noise may be different than the acoustic model for HVAC noise due to the spectral nature of the noises. Once the most representative acoustic model is identified, the ASR systems and methods simply use that one to complete the speech recognition. This dynamic switching can also be used to account for different speakers.

Referring now to FIG. 1, a block diagram of an Automatic Speech Recognition (ASR) system 10 for use in a vehicle is shown. ASR system 10 includes a controller 12. Controller 12 is in communication with a user microphone 14 within the cabin of the vehicle. User microphone 14 is configured to detect speech (e.g., commands) spoken by a user in the cabin of the vehicle. User microphone 14 provides an electronic signal indicative of the speech to controller 12. Under ordinary real-world operating conditions of the vehicle, some amount of noise is in the cabin. Thus, the speech detected by user microphone 14 is noisy speech. User microphone 14 thereby provides, as indicated in FIG. 1, an electronic signal 16 indicative of the noisy speech to controller 12.

Controller 12 is further in communication with one or more cabin noise microphones 18. Cabin noise microphones 18 are in various places within the cabin and are configured to detect the noise in the cabin. Cabin noise microphones 18 provide an electronic signal 20 indicative of the cabin noise to controller 12.

Controller 12 is further in communication with CAN bus 22 of the vehicle. Electronic signals indicative of vehicle parameters are communicated on CAN bus 22. Controller 12 receives an electronic signal 24 indicative of vehicle parameters such as vehicle speed, engine rpm, and HVAC settings from CAN bus 22.

Controller 12 is further in communication with wearables 26 worn by the user. Controller 12 receives an electronic signal 28 indicative of contextual information from wearables 26.

Controller 12 includes a processor stage 30 (labeled with the phrase "Noise Quantification") for performing a noise quantification operation. Processor stage 30 receives electronic signal 20 indicative of the cabin noise from cabin noise microphones 18, electronic signal 24 indicative of the vehicle parameters from CAN bus 22, and electronic signal 28 indicative of the contextual information from wearables 26. Processor stage 30 processes electronic signals 20, 24, and 28 to quantify the noise present in the vehicle cabin. Processor stage 30 generates an electronic signal 32 indicative of the quantified noise.

In this way, processor stage 30 quantifies the noise by several different means including information indicative of vehicle cabin noise from cabin noise microphones 18 doing passive noise analysis, information from CAN bus 22 indicative of vehicle parameters such as vehicle speed, engine rpm, and HVAC settings, and/or contextual information from wearables 26. The quantified noise represents the impact of the Lombard Effect. As such, processor stage 30 estimates the impact of the Lombard Effect by taking into account various inputs (i.e., detected cabin noise, vehicle parameters, and contextual information) regarding the cabin noise in a vehicle.

Controller 12 further includes a processor stage 34 (labeled with the phrase "Optimal Acoustic Model Selected") for performing an optimal acoustic model selection operation. Processor stage 34 has access to a library 36 (shown in FIG. 3) of pre-established acoustic models. Library 36 embodies multiple acoustic models put into a single vehicle system. The acoustic models of library 36 are pre-established by being trained in a laboratory setting to capture the important use cases. As such, each acoustic model in library 36 corresponds to a respective one of the use cases.

Processor stage 34 receives electronic signal 32 indicative of the quantified noise from processor stage 30. Processor stage 34 selects one of the acoustic models from library 36 as a function of the quantified noise. The function correlates the given noise to the best represented acoustic model. That is, processor stage 34 selects from library 36 the acoustic model which corresponds best, relative to the other acoustic models in library 36, to the quantified noise. The acoustic model selected by processor stage 34 is the acoustic model best trained to accommodate the noisy speech that is noisy due to the noise which is quantified. In this way, processor stage 34 dynamically selects an appropriate acoustic model, from library 36 of acoustic models, as a function of vehicle parameters and ambient noise. Processor stage 34 outputs an electronic signal 38 indicative of the selected acoustic model.

Controller 12 further includes a processor stage 40 (labeled with the phrase "Selected Acoustic Model Application to Noisy Speech") for processing the noisy speech with the selected acoustic model. Processor stage 40 receives electronic signal 16 indicative of the noisy speech from user microphone 14 and receives electronic signal 38 indicative of the selected acoustic model from processor stage 34. Processor stage 40 applies the selected acoustic model to the noisy speech to improve recognition of the speech and outputs an electronic signal 42 indicative of the speech.

A receiver 44 (labeled with the phrase "Speech Recognized") of ASR system 10 receives electronic signal 42 indicative of the speech. Receiver 44 compares the speech to a list of commands or the like in order to recognize the speech and then acts on the recognized speech accordingly.

As described, controller 12 in conjunction with user microphone 14, cabin noise microphones 18, CAN bus 22, and wearables 26 provide a dynamic switching acoustic model system. Controller 12 quantifies noise based on various inputs, selects an acoustic model based on the quantified noise, and applies the selected acoustic model to the noisy speech to improve recognition of the speech. Controller 12 performs this operation continuously such that as the noise changes the controller selects some other acoustic model most appropriate for the different noise and then applies this selected acoustic model to the noisy speech to improve recognition of the speech. In this way, controller 12 employs dynamic switching of acoustic models to improve speech recognition performance.

In a variation, user microphone 14 detects ambient noise in the cabin and communicates information indicative of the detected ambient noise to controller 12. In this manner, in addition to detecting speech spoken by a user in the cabin, user microphone 14 also functions as a cabin noise microphone configured to detect ambient noise in the cabin. As such, user microphone 14 can be used capture ambient noise in the cabin when no cabin microphone is available to do so.

Figure 2:
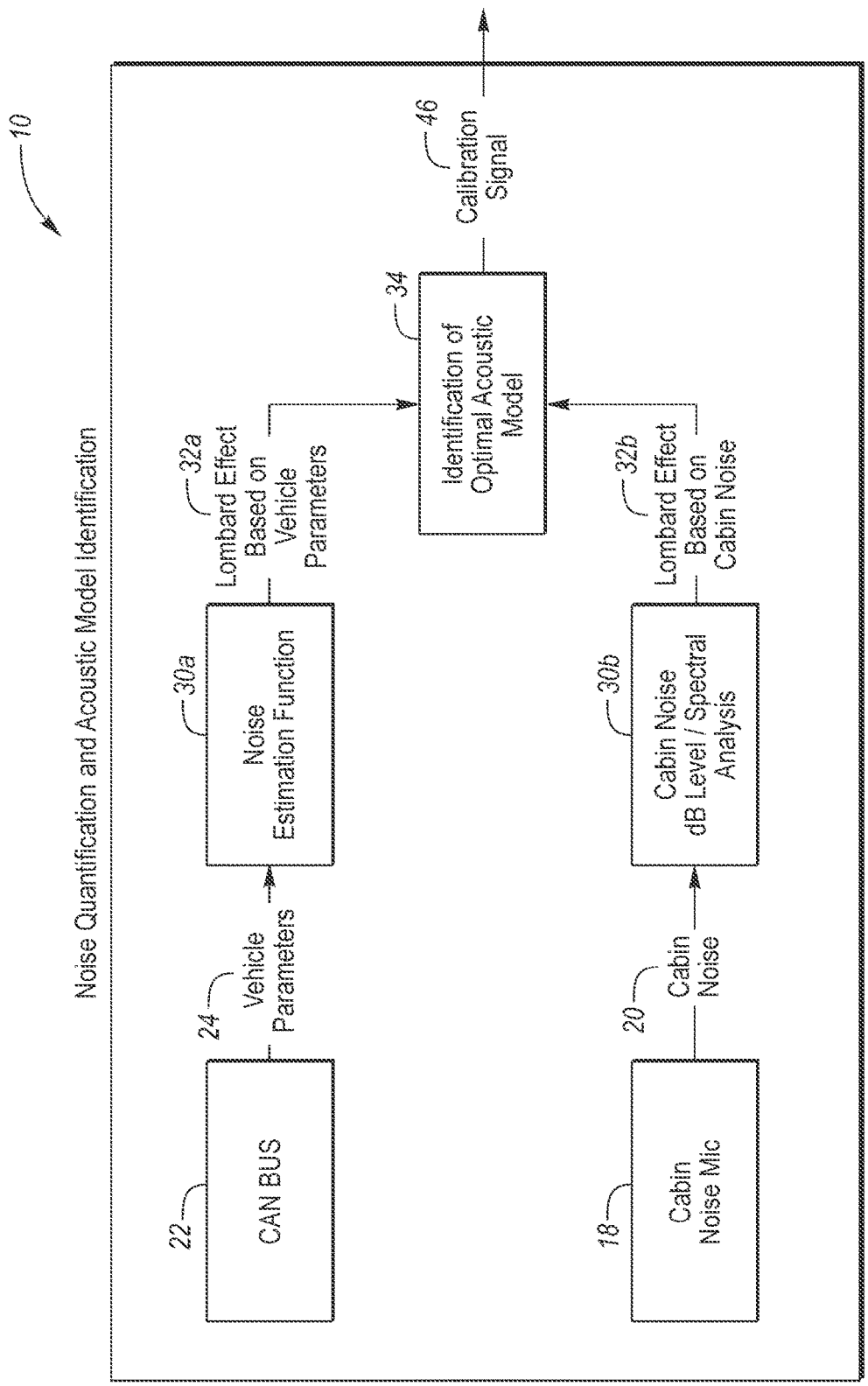
FIG. 2 illustrates a block diagram depicting noise quantification and acoustic model identification operations of the ASR system.

Referring now to FIG. 2, with continual reference to FIG. 1, a block diagram depicting noise quantification and acoustic model identification operations of ASR system 10 is shown. As described above, processor stage 30 of controller 12 of ASR system 10 is for performing a noise quantification operation. As shown in FIG. 2, processor stage 30 includes a first processor sub-stage 30a and a second processor sub-stage 30b. First processor sub-stage 30a receives electronic signal 24 indicative of the vehicle parameters from CAN bus 22 and second processor sub-stage 30b receives electronic signal 20 indicative of the cabin noise from cabin noise microphones 18.

First processor sub-stage 30a (labeled with the phrase "Noise Estimation Function") is for estimating the Lombard Effect based on the vehicle parameters. First processor sub-stage 30a generates an electronic signal 32a indicative of the estimated Lombard Effect based on the vehicle parameters. Second processor sub-stage 30b (labeled with the phrase "Cabin Noise Spectral Analysis") generates an electronic signal 32b indicative of the estimated Lombard Effect based on the cabin noise. Electronic signals 32a and 32b in conjunction with one another are indicative of the quantified noise environment, which is the overall output of the noise quantification operation of processor stage 30.

Processor stage 34 (labeled in FIG. 2 with the phrase "Identification of Optimal Acoustic Model") of controller 12 receives electronic signals 32a and 32b indicative of the estimated Lombard Effect based on vehicle parameters and cabin noise, respectively. Processor stage 34 selects one of the acoustic models from library 36 (shown in FIG. 3) as a function of the estimated Lombard Effect based on vehicle parameters and cabin noise. More generally, processor stage 34 selects one of the acoustic models from library 36 based on the quantified noise. In this way, processor stage 34 selects from library 36 the acoustic model which corresponds best to the quantified noise.

Processor stage 34 outputs an electronic calibration signal 46 that is indicative of which acoustic model processor stage 34 has selected. With reference to FIG. 3, processor stage 34 supplies electronic calibration signal 46 to library 36 for processor stage 40 of controller 12 to access the selected acoustic model. Processor stage 40 then applies the selected acoustic model to the noisy speech.

In a variation, the operation of processor stage 34 in selecting an acoustic model from library 36 includes processor stage 34 prescreening the acoustic models according to the estimated Lombard Effect based on the cabin noise to obtain a sub-set of candidate acoustic models and then further paring down the sub-set of candidate acoustic models according to the estimated Lombard Effect based on the vehicle parameters to select the most appropriate acoustic model from the sub-set of candidate acoustic models. As an example, processor stage 34 uses cabin noise dB level/spectral analysis information according to electronic signal 32b to prescreen the selection of acoustic models from library 36. Processor stage 34 then uses vehicle parameter information such as engine rpm and HVAC setting according to electronic signal 32a to further pare down the selection. Processor stage 34 further pares down the selection in this manner as an acoustic model for engine noise may be different than an acoustic model for HVAC noise due to the spectral nature of the noises.

As described, FIG. 2 in conjunction with FIG. 3 shows ASR system 10 initially quantifying the noise and then using a look-up table type function to identify the optimal acoustic model in library 36.

The acoustic models in library 36 illustrated in FIG. 3 are labeled with the general reference numeral 48. Acoustic models 48 are denoted with the phrase AM 'x', where 'x' is a unique identification number. As an example, acoustic model "AM 5" 48a is the acoustic model identified by electronic calibration signal 46 as being the acoustic model selected by processor stage 34 of controller 12.

The block diagram of FIG. 3 depicts acoustic model selection and selected acoustic model usage for speech recognition operations of ASR system 10. In operation, processor stage 34 outputs electronic calibration signal 46 indicative of the selected acoustic model to library 36. In turn, processor stage 40 accesses and applies the selected acoustic model to the noisy speech in order to recognize the speech.

FIG. 3 shows ASR system 10 having library 36 of N acoustic models available in a vehicle and how the ASR system selects one of the acoustic models (e.g., acoustic model 48a) as specified by electronic calibration signal 46 and applies the selected acoustic model to the noisy speech. As described herein, the selected acoustic model depends entirely on the noise analysis.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automatic speech recognition system for a vehicle, comprising:

a plurality of cabin noise microphones configured to detect ambient noise in a cabin of the vehicle;

a controller in communication with the cabin noise microphones and a controller area network (CAN) bus of the vehicle, the controller configured to select an acoustic model from a library of acoustic models based on ambient noise in the cabin of the vehicle detected by the cabin noise microphones and operating parameters of the vehicle obtained from the CAN bus of the vehicle and apply the selected acoustic model to noisy speech received from a user microphone in the cabin of the vehicle to improve recognition of the speech; and wherein the controller is further configured to select the acoustic model by initially selecting a sub-set of the acoustic models from the library based on the ambient noise in the cabin of the vehicle and subsequently selecting the acoustic model from the sub-set of the acoustic models based on the operating parameters of the vehicle.

2. The automatic speech recognition system of claim 1 wherein:

the information indicative of the operating parameters of the vehicle includes information indicative of vehicle engine rpm, vehicle speed, and vehicle HVAC settings.

3. The automatic speech recognition system of claim 1 wherein:

the controller is in communication with a wearable worn by a user of the vehicle to obtain contextual information from the wearable; and the controller is further configured to select the acoustic model from the library of acoustic models based on ambient noise in the cabin of the vehicle, operating parameters of the vehicle, and the contextual information.

4. The automatic speech recognition system of claim 1 wherein:

the acoustic models in the library differ from one another as the acoustic models respectively correspond to different use cases.

5. The automatic speech recognition system of claim 1 wherein:

the acoustic models are Lombard Effect acoustic models.

6. The automatic speech recognition system of claim 1 wherein:

the controller is further configured to estimate a Lombard Effect of the noisy speech based on the ambient noise in the cabin of the vehicle and the operating parameters of the vehicle; and the controller is further configured to select the acoustic model from the library of acoustic models based on the estimated Lombard Effect.

7. The automatic speech recognition system of claim 1 wherein:

the controller is further configured to estimate a Lombard Effect component of the noisy speech based on dB level and spectral analysis of the ambient noise in the cabin of the vehicle and to estimate a Lombard Effect component of the noisy speech based on the operating parameters of the vehicle; and the controller is further configured to select the acoustic model from the library of acoustic models based on the estimated Lombard Effect components.

8. A vehicle comprising:

microphones;

a CAN bus; and a controller to select a sub-set of acoustic models from a library of acoustic models based on ambient noise in a cabin of the vehicle detected by the microphones and subsequently select an acoustic model from the sub-set based on operating parameters of the vehicle obtained from the CAN bus and apply the selected acoustic model to the noisy speech to improve recognition of the speech.

* * * * *